(12) United States Patent
Itakura et al.

(10) Patent No.: US 7,419,723 B2
(45) Date of Patent: Sep. 2, 2008

(54) BASE COATING COMPOSITION FOR DECORATED MOLDINGS, TOP CLEAR COATING COMPOSITION FOR DECORATED MOLDINGS, AND DECORATED MOLDINGS

(75) Inventors: Tatsuya Itakura, Wako (JP); Takashi Yamamoto, Wako (JP); Manabu Yamaoka, Hirakata (JP); Toshihiko Uchiyama, Hirakata (JP)

(73) Assignees: Honda Motor Co., Ltd., Tokyo (JP); Nippon Bee Chemical Co., Ltd., Osaka (JP)

( * ) Notice: Subject to any disclaimer, the term of this patent is extended or adjusted under 35 U.S.C. 154(b) by 664 days.

(21) Appl. No.: 10/859,606

(22) Filed: Jun. 3, 2004

(65) Prior Publication Data
US 2005/0009983 A1    Jan. 13, 2005

(30) Foreign Application Priority Data
Jun. 4, 2003    (JP)    ............................... 2003-159951

(51) Int. Cl.
| | |
|---|---|
| A61Q 19/00 | (2006.01) |
| B32B 27/00 | (2006.01) |
| B32B 27/40 | (2006.01) |
| C08C 19/00 | (2006.01) |
| C08F 8/00 | (2006.01) |
| C08F 8/30 | (2006.01) |
| C08F 8/42 | (2006.01) |
| C08F 283/04 | (2006.01) |
| C08F 283/06 | (2006.01) |
| C08J 3/00 | (2006.01) |
| C08K 5/24 | (2006.01) |
| C08L 75/00 | (2006.01) |
| C08L 83/00 | (2006.01) |
| C08L 83/04 | (2006.01) |

(52) U.S. Cl. ................. 428/423.1; 428/425.8; 524/507; 524/588; 524/589; 524/590; 524/731; 524/906; 525/100; 525/101; 525/123; 525/342; 525/404; 525/455; 525/939

(58) Field of Classification Search ................ 524/589, 524/588, 507, 731, 906, 590; 525/123, 455, 525/100, 101, 342, 404, 939; 428/423.1, 428/425.8, 425.5
See application file for complete search history.

(56) References Cited

U.S. PATENT DOCUMENTS

| 2001/0031850 A1* | 10/2001 | Mohri et al. .................. 528/42 |
| 2002/0136844 A1 | 9/2002 | Hasegawa et al. |
| 2002/0160206 A1 | 10/2002 | Hasegawa et al. |

| 2003/0069381 A1 | 4/2003 | Huynh-Ba |

FOREIGN PATENT DOCUMENTS

| JP | 06016998 | 1/1994 |
| JP | 6-57198 | 3/1994 |
| JP | 06057198 | 3/1994 |
| JP | 07118605 | 5/1995 |
| JP | 10-309774 | 11/1998 |
| JP | 2002-256454 | 9/2002 |
| JP | 2002-256455 | 9/2002 |
| WO | WO 98/37985 | 9/1998 |
| WO | WO 98/37986 | 9/1998 |

* cited by examiner

*Primary Examiner*—Patrick D Niland
(74) *Attorney, Agent, or Firm*—Westerman, Hattori, Daniels & Adrian, LLP.

(57) ABSTRACT

It is an object of the present invention to provide a base coating composition for decorated moldings containing silver plating layer and a top clear coating composition for decorated moldings containing silver plating layer, and decorated moldings obtainable by using these compositions; the compositions and moldings are to be excellent in silver deposition tendency, basecoat film smoothness, adhesion and/or film appearance.

A base coating composition for decorated moldings containing silver plating layer comprising a main composition for base coating comprising an acrylic polyol (A1), an organic-modified polydimethylsiloxane (A2) and an epoxysilane (A3) represented by the chemical scheme (1):

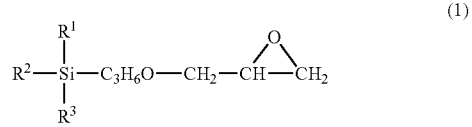

(1)

in the scheme, $R^1$ represents a methyl, methoxy or ethoxy group and $R^2$ and $R^3$ are the same or different and each represents a methoxy or ethoxy group, and a curing agent for base coating comprising a polyisocyanate, wherein the base coating composition for decorated moldings is a two-package curing type urethane coating composition, in the main composition for base coating, the (A2)/(A1) ratio is 0.02/100 to 0.20/100 on the solid weight basis and the (A3)/(A1) ratio is 1.5/100 to 5.5/100 on the solid weight basis, and the equivalent ratio between the NCO groups in the curing agent for base coating and the OH groups in the acrylic polyol (A1), namely the NCO/OH equivalent ratio, is 1.5 to 3.0.

5 Claims, No Drawings

BASE COATING COMPOSITION FOR DECORATED MOLDINGS, TOP CLEAR COATING COMPOSITION FOR DECORATED MOLDINGS, AND DECORATED MOLDINGS

TECHNICAL FIELD

The present invention relates to a base coating composition for decorated moldings containing silver plating layer, and a top clear coating composition for decorated moldings containing silver plating layer, and to decorated moldings.

BACKGROUND ART

Decorated moldings made of a plastic substrate with a silver plating layer formed thereon have a metal-like appearance and, therefore, can be used as interior parts of automobiles, such as meter clusters, center clusters and center consoles, or as exterior parts of automobiles, such as hubcaps, bumper moldings, wheel garnishes, grille radiators, back panels, door mirror covers and door handles, and in other fields of application than automobile parts, for example as air conditioner housings, and containers for cellular phones, notebook type personal computers, cosmetics, etc.

A method of producing such decorated moldings has been disclosed which comprises, for example, forming an undercoat layer on a substrate using a coating composition comprising an alkoxytitanium ester and at least one of an epoxy group containing-silane coupling agent and an epoxy resin and then forming a silver plating layer and a topcoat layer (cf. e.g. Japanese Kokai Publication Hei-10-309774, page 2).

The decorated moldings obtained by such a method of production have a basecoat layer, a silver plating layer and a topcoat layer formed in that order and, in silver plating layer formation, the so-called silver mirror reaction technique, which is a nonelectrolytic plating technique, is generally utilized. In producing such decorated moldings, such physical characteristics as silver deposition tendency, basecoat film smoothness, adhesion, film appearance are required. However, the conventional decorated moldings cannot always satisfy these requirements.

Other methods of producing decorated moldings, such as ones disclosed in Japanese Kokai Publication 2002-256454, page 2 and Japanese Kokai Publication 2002-256455, page 2, are also known. However, such methods of producing decorated moldings are not wholly satisfactory from the viewpoint of adhesion between the silver plating layer and basecoat layer, corrosion resistance of the laminate moldings obtained, silver plating layer deposition tendency, basecoat layer smoothness and/or appearance of the laminate moldings.

A coating composition to be applied to the silver surface which comprises a cold-curing silicone-acrylic resin has been disclosed as a technology of preventing discoloration of silver (cf. e.g. Japanese Kokai Publication Hei-06-57189, page 2). However, it is not entirely satisfactory from the appearance viewpoint, among others.

Accordingly, it is an object of the present invention to provide a base coating composition for decorated moldings containing silver plating layer and a top clear coating composition for decorated moldings containing silver plating layer, and decorated moldings obtainable by using these compositions; the compositions and moldings are to be excellent in silver deposition tendency, basecoat film smoothness, adhesion and film appearance.

SUMMARY OF THE INVENTION

The present invention provides a base coating composition for decorated moldings containing silver plating layer comprising a main composition for base coating comprising an acrylic polyol (A1), an organic-modified polydimethylsiloxane (A2) and an epoxysilane (A3) represented by the chemical scheme (1):

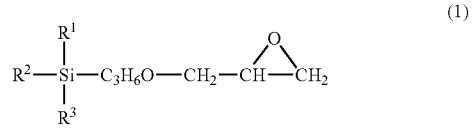

in the scheme, $R^1$ represents a methyl, methoxy or ethoxy group and $R^2$ and $R^3$ are the same or different and each represents a methoxy or ethoxy group, and a curing agent for base coating comprising a polyisocyanate, wherein the base coating composition for decorated moldings is a two-package curing type urethane coating composition, in the main composition for base coating, the (A2)/(A1) ratio is 0.02/100 to 0.20/100 on the solid weight basis and the (A3)/(A1) ratio is 1.5/100 to 5.5/100 on the solid weight basis, and the equivalent ratio between the NCO groups in the curing agent for base coating and the OH groups in the acrylic polyol (A1), namely the NCO/OH equivalent ratio, is 1.5 to 3.0.

The present invention further provides a top clear coating composition for decorated moldings containing silver plating layer containing a main composition for top clear coating comprising an acrylic polyol (B1) and an acrylic resin containing a tertiary amino group (B2), a curing agent 1 for top clear coating comprising a polyisocyanate, and a curing agent 2 for top clear coating comprising a compound (C1) containing epoxy groups and hydrolyzable silyl groups represented by the chemical scheme (2):

in the scheme, $R^4$ represents a hydrogen atom, an alkyl group or an aralkyl group and $R^5$ and $R^6$ are the same or different and each represents a halogen atom or a hydroxyl, alkoxy, acyloxy, phenoxy, iminoxy or alkenyloxy group, wherein the top clear coating composition for decorated moldings is a three-package curing type urethane coating composition, in the main composition for top clear coating, the (B2)/(B1) ratio is 99/1 to 20/80 on the solid weight basis and the mixing ratio between the compound (C1) in the curing agent 2 for top clear coating and the acrylic resin containing a tertiary amino group (B2) in the main composition for top clear coating, namely the ratio (C1)/(B2), is 10/100 to 50/100 on the solid weight basis.

The present invention further provides a top clear coating composition for decorated moldings containing silver plating layer comprising a main composition for top clear coating comprising an acrylic polyol (B1), a nonaqueous dispersion (B3) and an epoxysilane (A3) represented by the chemical scheme (1):

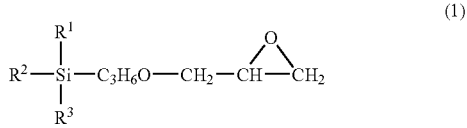

(1)

in the scheme, $R^1$ represents a methyl, methoxy or ethoxy group and $R^2$ and $R^3$ are the same or different and each represents a methoxy or ethoxy group, and a curing agent for top clear coating comprising a polyisocyanate, wherein the top clear coating composition for decorated moldings is a two-package curing type urethane coating composition, in the main composition for top clear coating, the (B3)/(B1) ratio is 5/95 to 25/75 on the solid weight basis and the mixing ratio between the epoxysilane (A3) in the main composition for top clear coating and the sum of the acrylic polyol (B1) and the nonaqueous dispersion (B3) in the main composition for top clear coating, namely the ratio (A3)/[(B1)+(B3)], is 1.5/100 to 5.5/100 on the solid weight basis.

The present invention further provides a decorated molding comprising a basecoat layer, a silver plating layer and a topcoat layer formed in that order on a plastic substrate, wherein the basecoat layer is one formed by using the base coating composition for decorated moldings containing silver plating layer mentioned above and the topcoat layer is one formed by using the top clear coating composition for decorated moldings containing silver plating layer mentioned above.

Preferably, the decorated molding has further a primer layer between the plastic substrate and the basecoat layer.

DETAILED DESCRIPTION OF THE INVENTION

In the following, the present invention is described in detail.

The base coating composition for decorated moldings according to the invention (hereinafter referred to as "base coating composition") is a two-package curing type urethane coating composition which comprises a main composition for base coating comprising an acrylic polyol (A1), an organic-modified polydimethylsiloxane (A2) and an epoxysilane (A3) represented by the chemical scheme (1) given hereinabove, and a curing agent for base coating comprising a polyisocyanate.

By using, as a base coating composition, a two-package curing type urethane coating composition which comprises a main composition for base coating comprising an acrylic polyol (A1), an organic-modified polydimethylsiloxane (A2) and an epoxysilane (A3) represented by the chemical scheme (1) given hereinabove, and a curing agent for base coating comprising a polyisocyanate, and by restricting the solid weight proportions of the components (A1), (A2) and (A3) within the above-specified ranges and further restricting the NCO/OH ratio within the above-specified range, it becomes possible to obtain decorated moldings excellent in all of adhesion, corrosion resistance, silver deposition tendency, basecoat layer smoothness and laminate molding appearance.

The acrylic polyol (A1) to be contained in the main composition for base coating is not particularly restricted but may be any hydroxyl group-containing acrylic resin. It may be a modified one.

The acrylic polyol (A1) preferably has a hydroxyl value of 60 to 140 mg KOH/g, more preferably 70 to 100 mg KOH/g. If the hydroxyl value is less than 60 mg KOH/g, the number of sites of crosslinking reaction with the polyisocyanate curing agent will be insufficient, hence the film physical properties may become unsatisfactory in some instances. When it exceeds 140 mg KOH/g, the number of sites of crosslinking reaction becomes excessive and, as a result, the film will become hard and brittle and/or the moisture resistance and water resistance will unfavorably decrease due to excessive hydroxyl groups in some instances.

The acrylic polyol (A1) has a weight average molecular weight preferably within the range of 10000 to 70000, more preferably 15000 to 50000. When that molecular weight is less than 10000, the film physical properties tend to deteriorate and, when it exceeds 70000, the workability in the step of application tends to decrease and the finish appearance tends to deteriorate. The weight average molecular weight values given in this description are the values obtained by measurement by GPC (gel permeation chromatography), followed by calculation on the polystyrene equivalent basis.

The acrylic polyol (A1) can be obtained by polymerizing, in the conventional manner, a monomer composition comprising a hydroxyl group-containing, radical-polymerizable monomer, together with another radical-polymerizable monomer, if necessary.

The hydroxyl group-containing, radical-polymerizable monomer is not particularly restricted but includes, among others, 2-hydroxyethyl (meth)acrylate, 2-hydroxybutyl (meth)acrylate, 4-hydroxybutyl (meth)acrylate, hydroxypropyl (meth)acrylate, and 2-hydroxyethyl (meth)acrylate-ring-opened ε-caprolactone adducts (Placcel FA and FM series, products of Daicel Chemical Industries). These may be used singly or two or more of them may be used in combination.

The above-mentioned other radical-polymerizable monomer is not particularly restricted but includes, among others, carboxyl group-containing monomers such as (meth)acrylic acid, maleic acid and itaconic acid, epoxy group-containing monomers such as glycidyl (meth)acrylate and, further, methyl (meth)acrylate, ethyl (meth)acrylate, isopropyl (meth)acrylate, n-butyl (meth)acrylate, 2-ethylhexyl (meth)acrylate, styrene, vinyltoluene, vinyl acetate, α-methylstyrene, and the like. These may be used singly or two or more of them may be used in combination.

The acrylic polyol (A1) is obtained by polymerizing the above monomer composition. Any of those methods of producing acrylic resins which are known in the art can be used as the method of producing the acrylic polyol (A1). Thus, such methods of polymerization as solution polymerization, nonaqueous dispersion polymerization and bulk polymerization may be employed. From the viewpoint of ease of polymerization, molecular weight adjustment and ease of use in coating composition preparation, however, the solution polymerization method is appropriate.

The acrylic polyol may be an alkyd-modified acrylic polyol resin. The alkyd-modified acrylic polyol resin is obtained by carrying out the polymerization reaction of the above monomer composition in the presence of an alkyd resin.

As commercial grades of the alkyd-modified acrylic polyol resin, there may be mentioned Acrydic WZU-771 and Acrydic LU-293 (both being products of Dainippon Ink and Chemicals), and Tesloyd 4220-50 (product of Hitachi Kasei Polymer), among others.

The organic-modified polydimethylsiloxane (A2) to be contained in the main composition for base coating is an organic compound-modified polydimethylsiloxane and is a compound to be used as a macromolecular leveling agent. The organic-modified polydimethylsiloxane (A2) is not particularly restricted but includes, among others, polyester-modified acrylic group-containing polydimethylsiloxane species and polyether-modified polydimethylsiloxane species. These may be used singly or two or more of them may be used in combination.

The organic-modified polydimethylsiloxane (A2) has a weight average molecular weight preferably within the range of 10000 to 50000, more preferably 10000 to 35000. When that molecular weight is less than 10000, the film physical properties tend to deteriorate and, when it exceeds 50000, the workability in the step of application tends to decrease and the finish appearance tends to deteriorate.

As commercial grades of the organic-modified polydimethylsiloxane (A2), there may be mentioned, for example, BYK-371, BYK-307 (both being products of BYK Chemie, Japan) and like polyester-modified acrylic group-containing polydimethylsiloxane species and polyether-modified polydimethylsiloxane species.

The epoxysilane (A3) represented by the chemical scheme (1) given hereinabove is a compound serving as a coupling agent. As the epoxysilane (A3), there may be mentioned 3-glycidoxypropyltrimethoxysilane (commercially available from Shin-Etsu Chemical under the trademark KBM 403), 3-glycidoxypropylmethyldiethoxysilane (commercially available from Shin-Etsu Chemical under the trademark KBE 402), and 3-glycidoxypropyltriethoxysilane (commercially available from Shin-Etsu Chemical under the trademark KBE 403), among others.

In the above main composition for base coating, the solid weight ratio [(A2)/(A1)] between the organic-modified polydimethylsiloxane (A2) and the acrylic polyol (A1) is 0.02/100 to 0.20/100. When the ratio is less than 0.02/100, the silver deposition tendency and basecoat layer smoothness will decrease. When it is above 0.20/100, the basecoat layer/silver plating layer adhesion, corrosion resistance and water resistance will deteriorate. The ratio is more preferably 0.04/100 to 0.16/100.

In the above main composition for base coating, the solid weight ratio [(A3)/(A1)] between the epoxysilane (A3) and the acrylic polyol (A1) is 1.5/100 to 5.5/100. When the ratio is less than 1.5/100, the basecoat layer/silver plating layer adhesion and corrosion resistance will decrease. When it exceeds 5.5/100, rainbow look will appear on the decorated moldings. The ratio is more preferably 2.0/100 to 5.0/100.

The main composition for base coating can be prepared by blending the above components with stirring by a well known method. Further, one or more of auxiliary ingredients, including pigments such as color pigments, extender pigments and bright pigments; solvents such as butyl acetate, toluene, xylene and methyl isobutyl ketone; and additives such as ultraviolet absorbers, antioxidants, curing catalysts and suspending agents, among others.

The curing agent for base coating comprises a polyisocyanate.

The polyisocyanate is not particularly restricted but may be any of those compounds which has at least two isocyanato groups, including, among others, aromatic ones such as tolylene diisocyanate, 4,4'-diphenylmethanediisocyanate, xylylene diisocyanate and metaxylylene diisocyanate; aliphatic ones such as hexamethylene diisocyanate; alicyclic ones such as isophoronediisocyanate; and not only monomeric forms thereof but also polymeric forms thereof of the biuret, nurate or adduct type, for instance. From the curability viewpoint, the polyisocyanate is preferably in a polymeric form. From the viewpoint of abrasion resistance of resulting films, aliphatic polyisocyanate compounds are preferred.

As commercial grades of the polyisocyanate, there may be mentioned, among others, Sumidur N-3300 and Sumidur N-3500 (both being products of Sumitomo Bayer Urethane), and Duranate THA-100 (product of Asahi Chemical Industry).

In the above base coating composition, the equivalent ratio (NCO)/(OH) between the NCO groups in the curing agent for base coating and the OH groups in the acrylic polyol (A1) is 1.5 to 3.0. When the ratio is less than 1.5, the basecoat layer/silver plating layer adhesion and corrosion resistance will decrease and, further, rainbow look will appear on the decorated moldings. When it exceeds 3.0, rainbow look will appear on the decorated moldings. The equivalent ratio (NCO/OH) is more preferably 1.5 to 2.5.

The first top clear coating composition for decorated moldings according to the invention (hereinafter referred to also as "first top clear coating composition") is a three-package curing type polyurethane coating composition which comprises a main composition for top clear coating comprising an acrylic polyol (B1) and an acrylic resin containing a tertiary amino group (B2), a curing agent 1 for top clear coating comprising a polyisocyanate, and a curing agent 2 for top clear coating comprising a compound (C1) containing epoxy groups and hydrolyzable silyl groups represented by the chemical scheme (2) given hereinabove.

The acrylic polyol (B1) to be contained in the main composition of the first top clear coating composition is not particularly restricted but may be hydroxyl group-containing acrylic resin. It may be a modified one.

The acrylic polyol (B1) to be contained in the main composition of the first top clear coating composition preferably has a hydroxyl value of 35 to 85 mg KOH/g, more preferably 40 to 75 mg KOH/g. If the hydroxyl value is less than 35 mg KOH/g, the number of sites of crosslinking reaction with the polyisocyanate curing agent will be insufficient, hence the film physical properties may become unsatisfactory in some instances. When it exceeds 85 mg KOH/g, the number of sites of crosslinking reaction becomes excessive and, as a result, the film will become hard and brittle and/or the moisture resistance and water resistance will unfavorably decrease due to excessive hydroxyl groups in some instances.

The acrylic polyol (B1) to be contained in the main composition of the first top clear coating composition has a weight average molecular weight preferably within the range of 10000 to 60000, more preferably 10000 to 40000. When that molecular weight is less than 10000, the film physical properties tend to deteriorate and, when it exceeds 60000, the workability in the step of application tends to decrease and the finish appearance tends to deteriorate.

The acrylic polyol (B1) to be contained in the main composition of the first top clear coating composition can be produced in the same manner as in the production of the acrylic polyol (A1) to be contained in the main composition of the above-mentioned base coating composition.

As commercial grades of the acrylic polyol (B1), there may be mentioned, among others, Dianal LR-2586 (product of Mitsubishi Rayon), Arothane 2050-55 (product of Nippon Shokubai) and Hitaloid 3371 (product of Hitachi Chemical).

The acrylic resin containing a tertiary amino group (B2) is an acrylic resin having side chain dialkylamino groups represented by $-N-R_2$. The acrylic resin containing a tertiary amino group (B2) can be prepared by radical copolymerization of a monomer composition comprising a tertiary amino group-containing, radical-polymerizable monomer and another radical-polymerizable monomer. As the tertiary amino group-containing, radical-polymerizable monomer, there may be mentioned various (meth)acrylic acid ester monomers such as 2-dimethylaminoethyl (meth)acrylate, 2-diethylaminoethyl (meth)acrylate, 3-dimethylaminopropyl (meth)acrylate, 3-diethylaminopropyl (meth)acrylate, N-[2-(meth)acryloyloxyethyl]piperidine, N-[2-(meth)acryloyloxyethyl]pyrrolidine and N-[2-(meth)acryloyloxyethyl] morpholine; various aromatic monomers such as 4-(N,N-dimethylamino)styrene, 4-(N,N-diethylamino)styrene and 4-vinylpyridine; (meth)acrylamide monomers such as N-[2-dimethylaminoethyl](meth)acrylamide and N-[3-dimethylaminopropyl](meth)acrylamide; vinyl ether monomers such as 2-dimethylaminoethyl vinyl ether, 2-diethylaminoethyl vinyl ether, 3-dimethylaminopropyl vinyl ether, 3-diethylaminopropyl vinyl ether, 4-dimetylaminobutyl vinyl ether and 6-dimethylaminohexyl vinyl ether.

The other radical-polymerizable monomer to be copolymerized with the tertiary amino group-containing, radical-polymerizable monomer is not particularly restricted but includes those radical-polymerizable monomers enumerated hereinabove that can be used in the above-mentioned acrylic polyol preparation. The method of polymerization for preparing the acrylic resin containing a tertiary amino group (B2) is not particularly restricted but may be any of the conventional methods.

The acrylic resin containing a tertiary amino group (B2) preferably has an amine value of 15 to 60 mg KOH/g. If the amine value is less than 15 mg KOH/g, the adhesion to the plating layer and the corrosion resistance will decrease and, when it exceeds 60 mg KOH/g, the films will become hard. The amine value is more preferably 20 to 55 mg KOH/g.

As commercial grades of the acrylic resin containing a tertiary amino group (B2), there may be mentioned Acrydic GZ-169, Acrydic A-9510 and Acrydic A-9521 (all being products of Dainippon Ink and Chemicals), for instance.

As the polyisocyanate to be contained in the curing agent 1 for top clear coating, there may be mentioned the same polyisocyanate species as mentioned above.

As suitable commercial grades of the polyisocyanate to be contained in the curing agent 1 for top clear coating, there may be mentioned, for example, Duranate 24A-90 PX (product of Asahi Chemical Industry), Sumidur N 3200-90M (product of Sumitomo Bayer Urethane) and Takenate D165N-90X (product of Mitsui Takeda Chemical).

The compound (C1) having epoxy groups and hydrolysable silyl groups represented by the chemical scheme (2) given hereinabove [hereinafter referred to also as "compound (C1)"], which is to be contained in the curing agent 2 for top clear coating, is a vinyl polymer containing these both reactive group species.

The hydrolysable silyl group includes, among others, organosilicon-containing readily hydrolysable reactive groups, for example hydroxysilyl groups, halosilyl groups, alkoxysilyl groups, phenoxysilyl groups, iminoxysilyl groups and alkenyloxysilyl groups respectively having such a functional group or groups as hydroxyl, halogen, epoxy, alkoxy, acyloxy, amido, phenoxy, iminoxy, and alkenyloxy groups.

The method of producing the compound (C1) is not particularly restricted but any of the methods known in the art can be applied. Thus, for example, mention may be made of the method comprising subjecting a hydrolysable silyl group-containing vinyl monomer, such as γ-(meth)acryloyloxypropyltrimethoxysilane or γ-(meth)acryloyloxypropyltriisopropenyloxysilane, and an epoxy group-containing vinyl monomer, such as (β-methyl)glycidyl (meth)acrylate or di(β-methyl)glycidyl maleate, to solution radical polymerization.

The compound (C1) preferably has an epoxy equivalent of 400 to 1000, more preferably 500 to 850. When it is below 400, the film physical properties tend to deteriorate and, when it exceeds 1000, the workability in the step of application tends to decrease and the finish appearance tends to deteriorate. Such commercial grades of the compound (C1) as A-9585, FZ-521 and FZ-523 (products of Dainippon Ink and Chemicals), among others, can be used.

In the first top clear coating composition the solid weight ratio [(B2)/(B1)] between the acrylic resin containing a tertiary amino group (B2) and the acrylic polyol (B1) in the main composition for top clear coating is 99/1 to 20/80. When it is less than 20/80, the adhesion to the silver plating layer and the corrosion resistance may decrease. The ratio is more preferably 90/10 to 40/60.

In the first top clear coating composition the solid weight ratio [(C1)/(B2)] between the compound (C1) and the acrylic resin containing a tertiary amino group (B2) is 10/100 to 50/100. When it is less than 10/100, the adhesion to the silver plating layer and the corrosion resistance may decrease. When it exceeds 50/100, the topcoat layer may become hard and/or brittle. The ratio is more preferably 10/100 to 30/100.

By using, as a top clear coating composition, the three-package curing type polyurethane coating composition which comprises the main composition for top clear coating comprising the acrylic polyol (B1) and the acrylic resin containing a tertiary amino group (B2), the curing agent for top clear coating 1 comprising the polyisocyanate, and the curing agent 2 for top clear coating comprising the compound (C1), and by restricting the solid weight proportions of the components (B1), (B2) and (C1) to the above-specified range, it becomes possible to achieve further improvements in adhesion, corrosion resistance, silver deposition tendency, basecoat layer smoothness and laminate molding appearance.

The second top clear coating composition according to the invention (hereinafter referred to as "second top clear coating composition") is a two-package curing type polyurethane coating composition which comprises a main composition for top clear coating comprising the acrylic polyol (B1), the nonaqueous dispersion (B3) and the epoxysilane (A3) represented by the chemical scheme (1) given hereinabove, and a curing agent for top clear coating comprising a polyisocyanate. In such type of top clear coating composition, the acrylic polyol (B1), epoxysilane (A3) represented by the chemical scheme (1) and polyisocyanate to be used may be respectively the same as those mentioned hereinabove referring to the top clear coating composition and base coating composition.

The nonaqueous dispersion (B3) is a resin dispersed in an organic solvent, which is generally referred to as "NAD". The nonaqueous dispersion (B3) is not particularly restricted but any arbitrary one of those nonaqueous dispersions which can be used in the field of coatings, for example acrylic, acrylic polyol-based, and acrylic-styrenic ones.

The nonaqueous dispersion (B3) preferably has a hydroxyl value of 0 to 250 mg KOH/g, more preferably 100 to 190 mg KOH/g. When the hydroxyl value is higher than 250 mg KOH/g, the number of sites of crosslinking reaction becomes excessive and, as a result, the film will become hard and brittle and/or the moisture resistance and water resistance will unfavorably decrease due to excessive hydroxyl groups in some instances.

As commercial grades of the nonaqueous dispersion (B3), there may be mentioned Setalux 1850SS-50 (product of Akzo Nobel) and Hitaloyd 6110 (product of Hitachi Chemical), among others.

In the second top clear coating composition the solid weight ratio [(B3)/(B1)] between the nonaqueous dispersion (B3) and the acrylic polyol (B1) in the main composition for top clear coating is 5/95 to 25/75. When the ratio is lower than 5/95, the adhesion to the silver plating layer and the corrosion resistance may deteriorate. When it is higher than 25/75, turbidity may result. More preferably, the ratio is 5/95 to 20/80.

In the second top clear coating composition the solid weight ratio [(A3)/[(B1)+(B3)]] between the epoxysilane (A3) and the sum of the acrylic polyol (B1) and the nonaqueous dispersion (B3) in the main composition for top clear coating is 1.5/100 to 5.5/100. When the ratio is lower than 1.5/100, the adhesion to the silver plating layer and the corrosion resistance may deteriorate. Ratios exceeding 5.5/100 are economically disadvantageous. The ratio is more preferably 2.0/100 to 4.0/100.

By using, as a top clear coating composition, the two-package curing type polyurethane coating composition comprising the main composition for top clear coating which comprises the acrylic polyol (B1), nonaqueous dispersion (B3) and epoxysilane (A3) and the curing agent for top clear coating comprising the polyisocyanate, and by restricting the solid weight proportions of the components (A3), (B1) and (B3) to the above-specified ranges, it becomes possible to achieve further improvements in adhesion, corrosion resistance, silver deposition tendency, basecoat layer smoothness and laminate molding appearance.

The top clear coating composition may contain, in addition to the components mentioned above, one or more of organic solvents such as butyl acetate, toluene and xylene; light stabilizers such as Sanol LS-292 (product of Sankyo); ultraviolet absorbers such as Tinuvin 384 (product of Ciba Specialty Chemicals); leveling agents such as SH 2000-100 CS (product of Toray Dow Corning); and other additives, as added according to need. In cases where the above optional additives are added, they may be added to either or both of the main composition for top clear coating and the curing agent for top clear coating. The main composition for top clear coating and the curing agent for top clear coating each can be prepared by blending the components mentioned above with stirring by conventional means.

By using the above-specified top clear coating composition, it becomes possible to further improve the corrosion resistance of the silver plating layer and the laminate molding appearance.

The decorated molding of the invention is a decorated molding comprising a basecoat layer, a silver plating layer and a topcoat layer formed in that order on a plastic substrate. Thus, it is a molding produced by forming, on a plastic substrate molding made of a plastic material having a specific shape, such as an injection molding, a film or sheet or like plate-shaped body, or a blow-molded container, a basecoat layer, a silver plating layer and a topcoat layer in that order; it has a metal-like appearance owing to the silver plating layer.

The basecoat layer is formed by using the above-mentioned base coating composition. The base coating composition is a two-package urethane coating composition comprising the main composition for base coating and the curing agent for base coating and, by blending the two components together just prior to use and applying the mixed composition, it is possible to form the above-mentioned basecoat layer. The basecoat layer formation by application of the above base coating composition can be achieved by a conventional method, for example in the manner of spray coating. After application, curing is preferably carried out by heating at 60 to 100° C. to give a film having a thickness of 20 to 30 μm after curing.

In producing the decorated molding of the invention, a silver plating layer is formed on the above basecoat layer. By forming a silver plating layer on the basecoat layer, it becomes possible to form a silver plating layer excellent in appearance and adhesion with proper silver deposition tendency.

The method of silver plating layer formation is not particularly restricted. For example, the nonelectrolytic plating method called silver mirror reaction can be employed. A most popular method comprises applying the so-called Tollens reagent, namely ammoniac silver nitrate ($[Ag(NH_3)_2]^+OH^-$), and a reducing agent solution to the basecoat layer surface so that they may be mixed up on that surface. The reducing agent is not particularly restricted but includes, among others, sugars such as glucose; aldehyde group-containing organic compounds such as glyoxal; sodium nitrite, and sodium thiosulfate.

The decorated molding of the invention has a topcoat layer formed on the silver plating layer. This serves to inhibit the silver plating layer from deteriorating, improve the corrosion resistance and further improve the laminate molding appearance. In the decorated molding of the invention, the topcoat layer is formed by using the above-mentioned top clear coating composition.

Irrespective of whether the top clear coating composition is the three-package urethane coating composition (first top clear coating composition) or the two-package urethane coating composition (second top clear coating composition), the respective components mentioned above are mixed up prior to application. The topcoat layer can be formed by applying the top clear coating composition in a conventional manner, for example in the manner of spray coating. After application, curing is preferably carried out by heating at 60 to 100° C. to give a film having a thickness of 30 to 35 μm after curing.

The plastic substrate to be used in producing the decorated moldings of the invention is not particularly restricted but includes, among others, ABS resins (acrylonitrile-butadiene-styrene copolymers), PC (polycarbonate)/ABS alloys, PP (polypropylene), olefin-derived thermoplastic elastomers (TPOs), PMMA (poly(methyl methacrylate)) and other TPEs (thermoplastic elastomers). These can be used in the form of moldings produced by such a known molding method as injection, extrusion or blow molding.

The plastic substrate may have a primer layer between the basecoat layer and the substrate surface. By forming a primer layer, it becomes possible to improve the adhesion between the basecoat layer and the substrate surface. In particular, when olefin-based plastic substrates showing poor adhesiveness, for example polypropylene, are used, it is preferable that the substrate have a primer layer.

The primer layer can be formed by applying a primer coating composition. Preferably used as the primer coating composition is a chlorinated polypropylene-based primer coating composition, such as, for example, RB 116 primer coating composition (product of Nippon Bee Chemical).

The decorated moldings of the invention can be appropriately used as interior parts of automobiles, such as meter clusters, center clusters and center consoles, or as exterior parts of automobiles, such as hubcaps, bumper moldings, wheel garnishes, grille radiators, back panels, door mirror covers and door handles, and in other fields of application than automobile parts, for example as air conditioner housings, and containers for cellular phones, notebook type personal computers, cosmetics, etc.

EXAMPLES

The following examples illustrate the present invention in further detail. They are, however, by no means limitative of the scope of the present invention. In the examples, "%" means "% by weight" unless otherwise specified.

(Preparation of a Main Composition Solution for Base Coating)

A vessel equipped with a stirrer was charged with an acrylic polyol and, with stirring, an organic-modified polydimethylsiloxane and an epoxysilane were added and, finally, butyl acetate was added. The resulting mixture was stirred for 30 minutes to give a main composition solution for base coating. The amounts of the respective ingredients incorporated were as shown in Tables 1 and 2. In Tables 1 and 2, "Acrydic WZU-771" is an acrylic polyol available from Dainippon Ink and Chemicals and is an alkyd-modified acrylic resin with an OH value of 84 mg KOH/g, a weight average molecular weight of 20000, a solid weight percentage of 50% and an acid value of 5 mg KOH/g. "BYK-371" is a polyester-modified acryl group-containing polydimethylsiloxane available from BYK Chemie Japan; it has a weight average molecular weight of 28000 and an OH value of 0 mg KOH/g. "KBM-403" is 3-glycidoxypropyltrimethoxysilane (epoxy equivalent 236) available from Shin-Etsu Chemical.

TABLE 1

| | | Base coating 1 | | Base coating 2 | | Base coating 3 | | Base coating 4 | |
|---|---|---|---|---|---|---|---|---|---|
| | | Solid matter | Solution | Solid matter | Solution | Solid matter | Solution | Solid matter | Solution |
| Main composition solution for base coating | A1: Acrylic polyol Acrydic WZU-771 | 100 | 200.0 | 100 | 200.0 | 100 | 200.0 | 100 | 200.0 |
| | A2: Organic-modified polydimethylsiloxane BYK-371 | 0.10 | 0.25 | 0.04 | 0.10 | 0.07 | 0.18 | 0.18 | 0.45 |
| | A3: Epoxysilane KBM 403 | 3.5 | 3.5 | 3.5 | 3.5 | 3.5 | 3.5 | 3.5 | 3.5 |
| | Butyl acetate | | 45.3 | | 45.4 | | 45.3 | | 45.3 |
| | Total | 103.6 | 249.05 | 103.54 | 249.00 | 103.57 | 248.98 | 103.68 | 249.25 |
| | NV % | | 41.6 | | 41.6 | | 41.6 | | 41.6 |
| Curing agent solution for base coating | Polyisocyanate Sumidur N-3300 | 57.2 | 76.3 | 57.2 | 76.3 | 57.2 | 76.3 | 57.2 | 76.3 |
| NCO/OH equivalent ratio | | 2/1 | | 2/1 | | 2/1 | | 2/1 | |
| A2/(A1:100) solid weight ratio | | 0.10 | | 0.04 | | 0.07 | | 0.18 | |
| A3/(A1:100) solid weight ratio | | 3.5 | | 3.5 | | 3.5 | | 3.5 | |

| | | Base coating 5 | | Base coating 6 | | Base coating 7 | |
|---|---|---|---|---|---|---|---|
| | | Solid matter | Solution | Solid matter | Solution | Solid matter | Solution |
| Main composition solution for base coating | A1: Acrylic polyol Acrydic WZU-771 | 100 | 200.0 | 100 | 200.0 | 100 | 200.0 |
| | A2: Organic-modified polydimethylsiloxane BYK-371 | 0.10 | 0.25 | 0.10 | 0.25 | 0.15 | 0.38 |
| | A3: Epoxysilane KBM 403 | 2.0 | 2.0 | 5.0 | 5.0 | 4.0 | 4.0 |
| | Butyl acetate | | 43.2 | | 47.4 | | 46.0 |
| | Total | 102.1 | 245.45 | 105.1 | 252.65 | 104.15 | 250.38 |
| | NV % | | 41.6 | | 41.6 | | 41.6 |
| Curing agent solution for base coating | Polyisocyanate Sumidur N-3300 | 57.2 | 76.3 | 57.2 | 76.3 | 42.9 | 57.2 |
| NCO/OH equivalent ratio | | 2/1 | | 2/1 | | 1.5/1 | |
| A2/(A1:100) solid weight ratio | | 0.10 | | 0.10 | | 0.15 | |
| A3/(A1:100) solid weight ratio | | 2.0 | | 5.0 | | 4.0 | |

TABLE 2

| | | Base coating 8 | | Base coating 9 | | Base coating 10 | | Base coating 11 | | Base coating 12 | | Base coating 13 | |
|---|---|---|---|---|---|---|---|---|---|---|---|---|---|
| | | Solid matter | Solution | Solid matter | Solution | Solid matter | Solution | Solid matter | Solution | Solid matter | Solution | Solid matter | Solution |
| Main composition solution for base coating | A1: Acrylic polyol Acrydic WZU-771 | 100 | 200.0 | 100 | 200.0 | 100 | 200.0 | 100 | 200.0 | 100 | 200.0 | 100 | 200.0 |
| | A2: Organic-modified polydimethylsiloxane BYK-371 | 0 | 0 | 0.30 | 0.75 | 0.10 | 0.25 | 0.10 | 0.25 | 0.10 | 0.25 | 0.10 | 0.25 |
| | A3: Epoxysilane KBM 403 | 3.5 | 3.5 | 3.5 | 3.5 | 0 | 0 | 6.0 | 6.0 | 1.0 | 1.0 | 3.5 | 3.5 |
| | Butyl acetate | | 45.3 | | 45.3 | | 40.4 | | 48.8 | | 41.8 | | 45.3 |
| | Total | 103.50 | 248.8 | 103.80 | 249.55 | 100.10 | 240.65 | 106.10 | 255.05 | 101.10 | 243.05 | 103.60 | 249.05 |
| | NV % | | 41.6 | | 41.6 | | 41.6 | | 41.6 | | 41.6 | | 41.6 |
| Curing agent solution for base coating | Polyisocyanate Sumidur N-3300 | 57.2 | 76.3 | 57.2 | 76.3 | 57.2 | 76.3 | 57.2 | 76.3 | 57.2 | 76.3 | 37.2 | 49.6 |

TABLE 2-continued

|  | Base coating 8 | | Base coating 9 | | Base coating 10 | | Base coating 11 | | Base coating 12 | | Base coating 13 | |
| --- | --- | --- | --- | --- | --- | --- | --- | --- | --- | --- | --- | --- |
|  | Solid matter | Solution | Solid matter | Solution | Solid matter | Solution | Solid matter | Solution | Solid matter | Solution | Solid matter | Solution |
| NCO/OH equivalent ratio | 2/1 | | 2/1 | | 2/1 | | 2/1 | | 2/1 | | 13/1 | |
| A2/(A1:100) solid weight ratio | 0 | | 0.30 | | 0.10 | | 0.10 | | 0.1 | | 0.10 | |
| A3/(A1:100) solid weight ratio | 3.5 | | 3.5 | | 0 | | 6.0 | | 1.0 | | 3.5 | |

(Preparation of Main Composition Solutions for Top Clear Coating for use in Top Clear Coating Compositions 1 to 4, 8 and 13)

A vessel equipped with a stirrer was charged with an acrylic polyol, butyl acetate and an acrylic resin containing a tertiary amino group and, with stirring, an additive solution, Sanol LS-292 and a 90% (by weight) solution of Tinuvin 384 in xylene were added, followed by 30 minutes of stirring to give a main composition solution for top clear coating. The amounts of the respective ingredients incorporated were as shown in Tables 3 and 4. In Tables 3 and 4, "Dianal LR-2586" is an acrylic polyol available from Mitsubishi Rayon; it has an OH value of 60 mg KOH/g, a weight average molecular weight of 30000, a glass transition temperature of 40° C., an acid value of 3 mg KOH/g and a solid content of 45% by weight. "Acrydic GZ-169" is an acrylic resin containing a tertiary amino group available from Dainippon Ink and Chemicals; it has an amine value of 40 mg KOH/g, a weight average molecular weight of 30000 and a glass transition temperature of 25° C. "SH 2000-100 CS" is a leveling agent available from Toray Dow Corning. "Sanol LS-292" is a light stabilizer available from Sankyo. "Tinuvin 384" is an ultraviolet absorber available from Ciba Specialty Chemicals; it occurs as a xylene solution with a solid content of 90% by weight.

(Preparation of Main Composition Solutions for Top Clear Coating for use in Top Clear Coating Compositions 5 to 7 and 9 to 12)

A vessel equipped with a stirrer was charged with an acrylic polyol and butyl acetate and, with stirring, an epoxysilane, an additive solution, Sanol LS-292 and a 90% (by weight) solution of Tinuvin 384 in xylene were added and, finally, a nonaqueous dispersion was added, followed by 30 minutes of stirring to give a main composition solution for top clear coating. The amounts of the respective ingredients incorporated were as shown in Tables 3 and 4. In the tables, "Setalux 1850SS-50" is an acrylic NAD available from Akzo Nobel; it has an OH value of 169 mg KOH/g.

TABLE 3

| | | Clear coating 1 | | Clear coating 2 | | Clear coating 3 | | Clear coating 4 | | Clear coating 5 | | Clear coating 6 | | Clear coating 7 | |
| --- | --- | --- | --- | --- | --- | --- | --- | --- | --- | --- | --- | --- | --- | --- | --- |
| | | Solid matter | Solution | Solid matter | Solution | Solid matter | Solution | Solid matter | Solution | Solid matter | Solution | Solid matter | Solution | Solid matter | Solution |
| Main composition solution for top clear coating | B1: Acrylic polyol Dianal LR-2586 | 1.0 | 2.2 | 75.0 | 166.7 | 50.0 | 111.1 | 35.0 | 77.8 | 90.0 | 200.0 | 75.0 | 166.7 | 90.0 | 200.0 |
| | B2: Acrylic resin containing a tertiary amino group Acrydic GZ-169 | 99.0 | 206.2 | 25.0 | 52.1 | 50.0 | 104.2 | 65.0 | 135.4 | | | | | | |
| | B3: Nonaqueous dispersion Setalux 1850SS-50 | | | | | | | | | 10.0 | 20.0 | 25.0 | 50.0 | 10.0 | 20.0 |
| | A3: Epoxysilane KBM 403 | | | | | | | | | 5.0 | 5.0 | 2.0 | 2.0 | 3.0 | 3.0 |
| | Additive solution SH2000-100CS | 0.02 | 2.0 | 0.02 | 2.0 | 0.02 | 2.0 | 0.02 | 2.0 | 0.02 | 2.0 | 0.02 | 2.0 | 0.02 | 20 |
| | Sanol LS-292 | 1.0 | 1.0 | 1.0 | 1.0 | 1.0 | 1.0 | 1.0 | 1.0 | 1.7 | 1.7 | 1.7 | 1.7 | 1.7 | 1.7 |
| | Tinuvin 384 solution | 2.3 | 2.6 | 2.3 | 2.6 | 2.3 | 2.6 | 2.3 | 2.6 | 4.1 | 4.6 | 4.1 | 4.6 | 4.1 | 4.6 |
| | Butyl acetate | | 26.8 | | 16.4 | | 19.9 | | 22.0 | | 39.0 | | 37.9 | | 36.1 |
| | Total | 103.32 | 240.8 | 103.32 | 240.8 | 103.32 | 240.8 | 103.32 | 240.8 | 110.82 | 272.3 | 107.82 | 264.9 | 108.82 | 267.4 |
| | NV % | | 42.9 | | 42.9 | | 42.9 | | 42.9 | | 40.7 | | 40.7 | | 40.7 |
| Curing agent solution for top clear coating | Polyisocyanate Duranate 24A-90PX | 0.19 | 0.2 | 14.3 | 15.9 | 10.0 | 11.1 | 6.7 | 7.4 | 17.1 | 19.0 | 14.3 | 15.9 | 17.1 | 19.0 |
| | C1: Silicone compound A-9585 | 33.0 | 41.3 | 11.3 | 14.1 | 17.0 | 21.3 | 9.8 | 12.3 | | | | | | |
| B2/B1 solid weight ratio | | 99/1 | | 25/75 | | 50/50 | | 65/35 | | | | | | | |
| C1/(B2:100) solid weight ratio | | 33 | | 45 | | 34 | | 15 | | | | | | | |
| B3/B1 solid weight ratio | | | | | | | | | | 10/90 | | 25/75 | | 10/90 | |
| A3/(B1 + B3:100) solid weight ratio | | | | | | | | | | 5.0 | | 2.0 | | 3.0 | |
| NCO/OH solid weight ratio | | 1/1 | | 1/1 | | 1.1/1 | | 1/1 | | 1/1 | | 1/1 | | 1/1 | |

TABLE 4

|  |  | Clear coating 8 | | Clear coating 9 | | Clear coating 10 | | Clear coating 11 | | Clear coating 12 | | Clear coating 13 | |
|---|---|---|---|---|---|---|---|---|---|---|---|---|---|
|  |  | Solid matter | Solution | Solid matter | Solution | Solid matter | Solution | Solid matter | Solution | Solid matter | Solution | Solid matter | Solution |
| Main composition solution for top clear coating | B1: Acrylic polyol Dianal LR-2586 | 85.0 | 188.9 | 100.0 | 222.2 | 70.0 | 155.6 | 90.0 | 200.0 | 90.0 | 200.0 | 50.0 | 111.1 |
|  | B2: Acrylic resin containing a tertiary amino group Acrydic GZ-169 | 15.0 | 31.2 |  |  |  |  |  |  |  |  | 50.0 | 104.2 |
|  | B3: Nonaqueous dispersion Setalux 1850SS-50 |  |  | 0 | 0 | 30.0 | 60.0 | 10.0 | 20.0 | 10.0 | 20.0 |  |  |
|  | A3: Epoxysilane KBM 403 |  |  | 3.0 | 3.0 | 3.0 | 3.0 | 0.5 | 0.5 | 6.0 | 6.0 |  |  |
|  | Additive solution SH2000-100CS | 0.02 | 2.0 | 0.02 | 2.0 | 0.02 | 2.0 | 0.02 | 2.0 | 0.02 | 2.0 | 0.02 | 2.0 |
|  | Sanol LS-292 | 1.0 | 1.0 | 1.7 | 1.7 | 1.7 | 1.7 | 1.7 | 1.7 | 1.7 | 1.7 | 1.0 | 1.0 |
|  | Tinuvin 384 solution | 2.3 | 2.6 | 4.1 | 4.6 | 4.1 | 4.6 | 4.1 | 4.6 | 4.1 | 4.6 | 2.3 | 2.6 |
|  | Butyl acetate |  | 15.1 |  | 33.9 |  | 40.5 |  | 32.4 |  | 40.4 |  | 19.9 |
|  | Total | 103.32 | 240.8 | 108.82 | 267.4 | 108.82 | 267.4 | 106.32 | 261.2 | 111.82 | 274.7 | 103.32 | 240.8 |
|  | NV % |  | 42.9 |  | 40.7 |  | 40.7 |  | 40.7 |  | 40.7 |  | 42.9 |
| Curing agent solution for top clear coating | Polyisocyanate Duranate 24A-90PX | 16.2 | 18.0 | 19.0 | 21.1 | 13.3 | 14.8 | 17.1 | 19.0 | 17.1 | 19.0 | 10.0 | 11.1 |
|  | C1: Silicone compound A-9585 | 8.3 | 10.4 |  |  |  |  |  |  |  |  | 2.5 | 3.1 |
|  | B2/B1 solid weight ratio | 15/85 | | | | | | | | | | 50/50 | |
|  | C1/(B2:100) solid weight ratio | 55 | | | | | | | | | | 5 | |
|  | B3/B1 solid weight ratio | | | 0/100 | | 30/70 | | 10/90 | | 10/90 | | | |
|  | A3/(B1 + B3:100) solid weight ratio | | | 3.0 | | 3.0 | | 0.5 | | 60 | | | |
|  | NCO/OH solid weight ratio | 1.1/1 | | 1/1 | | 1/1 | | 1/1 | | 1/1 | | 1.1/1 | |

(Pretreatment of Polypropylene-made Articles)

Polypropylene test specimens, 70 mm×100 mm×3 mm in size, were washed with isopropanol, then dried, and sprayed with a chlorinated polypropylene-based primer coating composition (RB-116, product of Nippon Bee Chemical, diluted to a weight ratio of RB-116/diluent solvent A=100/40; the diluent solvent A being a toluene/xylene/Ipusol 100 (hydrocarbon solvent available from Marubeni Chemix) (20/20/60 by weight) mixture) to a dry film thickness of 7 μm, followed by 10 minutes of drying at 80° C.

(Pretreatment of ABS-made Articles)

ABS test specimen moldings, 70 mm×100 mm×3 mm in size, were washed with isopropanol and then dried.

Examples 1 to 9 and Comparative Examples 1 to 10

Basecoat Film Formation

Each of the main composition solutions for base coating as specified in Tables 1 and 2 was dissolved in a diluent solvent B (mixture of butyl acetate/methyl isobutyl ketone/xylene/Ipusol 100=35/10/32.5/22.5 (weight ratio)) in a mixing ratio of 1:1 and, further, a curing agent solution containing 75% by weight of Sumidur N-3300 (Sumitomo Bayer Urethane's polyisocyanate compound; NCO=22% by weight) was admixed therewith with stirring to give a base coating composition. The base coating composition was applied, by spraying, to some of the substrates pretreated in the above manner to attain a cured film thickness of 25 μm, followed by 30 minutes of drying at 80° C. Samples with a basecoat film formed thereon were thus obtained.

Silver Plating Film Formation

A 0.2% solution of tin(II) chloride in 0.2% hydrochloric acid was applied onto the film surface of each test specimen carrying the basecoat film formed as mentioned above, followed by washing with water. A mixed aqueous solution containing silver nitrate and excess ammonia and a glucose solution were simultaneously applied to the test specimen after washing with water to thereby form an about 20-μm-thick uniform silver plating film. The remaining solutions were removed by washing with water, whereby a test specimen having a silver plating film formed on the basecoat film was obtained.

Topcoat Film Formation

Top clear coating compositions was prepared by mixing the main compositions for top clear coating as specified in Tables 3 and 4 with the above-mentioned diluent solvent B in a mixing ratio of 1:1 and further adding "Duranate 24A-90PX" (Asahi Chemical Industry's polyisocyanate compound; NCO=23.6% by weight) and "A-9585" (Dainippon Ink and Chemicals' silicone compound; epoxy equivalent 700) in the proportions specified in Tables 3 and 4. Each of the top clear coating compositions specified in Tables 5 and 6 was applied, by spraying, to the test specimens having the silver plating film formed thereon to attain a cured film thickness of 30 μm, followed by 20 minutes of curing at 80° C. Topcoat films were thus formed. "Duranate 24A-90PX" is a polyisocyanate available from Asahi Chemical Industry, and "A-9585" is a compound containing an epoxy group and hydrolysable silyl group available from Dainippon Ink and Chemicals.

In Example 1, a topcoat film was formed in the same manner as described above using a composition prepared by diluting R-241 Top Clear (two-package curing type urethane coating composition available from Nippon Bee Chemical) with the diluent solvent B in a mixing ratio of 100/50 by weight.

Evaluation Methods

The decorated moldings obtained in Examples 1 to 9 and Comparative Examples 1 to 10 were evaluated by the methods described below. The results are shown in Table 5 and Table 6.

<Silver Deposition Tendency>

The state of silver plating film formation was observed by the eye and judged according to the following criteria:

O: Uniform silver plating film formation;
X: Irregular silver plating film formation.

<Basecoat Film Smoothness>

The basecoat film surface smoothness was evaluated by the eye according to the following criteria:

O: Smooth basecoat film surface;
X: Unsmooth basecoat film surface.

X: Abnormality such as discoloration or exfoliation is observed on the silver plating film.

<Film Appearance>

The appearance of each of the test specimens of the examples and comparative examples was evaluated by the eye according to the following criteria:

O: No interferogram, nor turbidity nor any other appearance abnormality is observable.
X: An appearance abnormality, such as interferogram or turbidity, is observed.

TABLE 5

|  |  | Example 1 | Example 2 | Example 3 | Example 4 | Example 5 | Example 6 | Example 7 | Example 8 | Example 9 |
|---|---|---|---|---|---|---|---|---|---|---|
|  | Base coating | Base coating 1 | Base coating 2 | Base coating 3 | Base coating 1 | Base coating 4 | Base coating 5 | Base coating 6 | Base coating 7 | Base coating 1 |
|  | Clear coating | R-241 clear coating | Clear coating 1 | Clear coating 2 | Clear coating 3 | Clear coating 4 | Clear coating 5 | Clear coating 6 | Clear coating 7 | Clear coating 3 |
|  | Article material | PP | PP | PP | PP | PP | PP | PP | PP | ABS |
| Evaluation results | Water-resisting secondary adhesion | O | O | O | O | O | O | O | O | O |
|  | Corrosion resistance | O | O | O | O | O | O | O | O | O |
|  | Silver deposition tendency | O | O | O | O | O | O | O | O | O |
|  | Basecoat film smoothness | O | O | O | O | O | O | O | O | O |
|  | Decorated molding appearance | O | O | O | O | O | O | O | O | O |

TABLE 6

|  |  | Compar. Ex. 1 | Compar. Ex. 2 | Compar. Ex. 3 | Compar. Ex. 4 | Compar. Ex. 5 | Compar. Ex. 6 | Compar. Ex. 7 | Compar. Ex. 8 | Compar. Ex. 9 | Compar. Ex. 10 |
|---|---|---|---|---|---|---|---|---|---|---|---|
|  | Base coating | Base coating 8 | Base coating 9 | Base coating 10 | Base coating 11 | Base coating 8 | Base coating 12 | Base coating 11 | Base coating 9 | Base coating 9 | Base coating 13 |
|  | Clear coating | Clear coating 3 | Clear coating 7 | Clear coating 3 | Clear coating 7 | Clear coating 8 | Clear coating 9 | Clear coating 10 | Clear coating 11 | Clear coating 12 | Clear coating 13 |
|  | Article material | PP | ABS | PP | PP | PP | PP | PP | PP | PP | PP |
| Evaluation results | Water-resisting secondary adhesion | O | X | X | O | X | X | O | X | X | X |
|  | Corrosion resistance | O | X | X | O | X | X | O | X | X | X |
|  | Silver deposition tendency | X | O | O | O | O | O | O | O | O | O |
|  | Basecoat film smoothness | X | O | O | O | O | O | O | O | O | O |
|  | Decorated molding appearance | O | O | O | X | O | O | X | O | O | O |

<Adhesion>

Each of the test specimens of the examples and comparative examples was immersed in warm water at 40° C. for 10 days, then taken out and deprived of the surface water by wiping, and allowed to stand at 25° C. for 1 hour. Thereafter, it was subjected to cross cut adhesive tape peel testing according to JIS K 5400. Evaluation was made according to the following criteria:

O: Neither peeling nor cut portion chipping;
X: Cut portion chipping and/or peeling.

<Corrosion Resistance>

Each of the test specimens of the examples and comparative examples was immersed in a 5% aqueous solution of sodium chloride at 40° C. for 5 days, then washed with water, deprived of the surface water by wiping, and observed for surface condition by the eye.

O: The silver plating film is in good condition without any discoloration, any exfoliation or any other abnormality;

As is evident from the results shown in Table 5 and Table 6, the decorated moldings of the invention are excellent in each of silver deposition tendency, basecoat film smoothness, adhesion and film appearance whereas the decorated moldings of the comparative examples are poor in some or other physical characteristics and therefore not suited for use.

As described hereinabove, the present invention can provide decorated moldings excellent in silver deposition tendency, basecoat film smoothness, adhesion and film appearance.

The invention claimed is:

1. A base coating composition for decorated moldings containing silver plating layer comprising a main composition for base coating comprising an acrylic polyol (A1), at least one selected from the group consisting of a polyester-modified acrylic group-containing polydimethylsiloxane and a poly-ether modified polydimethylsiloxane (A2) and an epoxysilane (A3) represented by the chemical scheme (1):

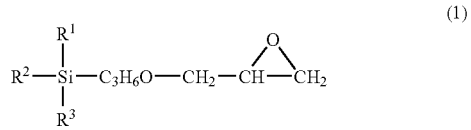

(1)

in the scheme, $R^1$ represents a methyl, methoxy or ethoxy group and $R^2$ and $R^3$ are the same or different and each represents a methoxy or ethoxy group, in the main composition for base coating, the (A2)/(A1) ratio being 0.02/100 to 0.20/100 on the solid weight basis and the (A3)/(A1) ratio being 1.5/100 to 5.5/100 on the solid weight basis, and a curing agent for base coating comprising a polyisocyanate, wherein the base coating composition for decorated moldings is a two-package curing urethane coating composition, and the equivalent ratio between the NCO groups in the curing agent for base coating and the OH groups in the acrylic polyol (A1), namely the NCO/OH equivalent ratio, is 1.5 to 3.0.

2. A top clear coating composition for decorated moldings containing silver plating layer containing a main composition for top clear coating comprising an acrylic polyol (B1) and an acrylic resin containing a tertiary amino group (B2), in the main composition for top clear coating, the (B2)/(B1) ratio being 99/1 to 20/80 on the solid weight basis, a curing agent 1 for top clear coating comprising a polyisocyanate, and a curing agent 2 for top clear coating comprising a compound (C1) containing epoxy groups and hydrolyzable silyl groups represented by the chemical scheme (2):

(2)

in the scheme, $R^4$ represents a hydrogen atom, an alkyl group or an aralkyl group and $R^5$ and $R^6$ are the same or different and each represents a halogen atom or a hydroxyl, alkoxy, acyloxy, phenoxy, iminoxy or alkenyloxy group, wherein the top clear coating composition for decorated moldings is a three-package curing urethane coating composition, and the mixing ratio between the compound (C1) in the curing agent 2 for top clear coating and the acrylic resin containing a tertiary amino group (B2) in the main composition for top clear coating, namely the ratio (C1)/(B2), is 10/100 to 50/100 on the solid weight basis.

3. A top clear coating composition for decorated moldings containing silver plating layer comprising a main composition for top clear coating comprising an acrylic polyol (B1), a nonaqueous dispersion (B3) and an epoxysilane (A3) represented by the chemical scheme (1):

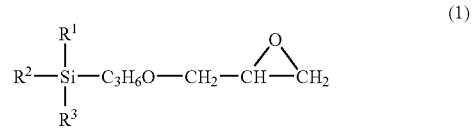

(1)

in the scheme, $R^1$ represents a methyl, methoxy or ethoxy group and $R^2$ and $R^3$ are the same or different and each represents a methoxy or ethoxy group, in the main composition for top clear coating, the (B3)/(B1) ratio being 5/95 to 25/75 on the solid weight basis, and a curing agent for top clear coating comprising a polyisocyanate, wherein the top clear coating composition for decorated moldings is a two-package curing urethane coating composition, and the mixing ratio between the epoxysilane (A3) in the main composition for top clear coating and the sum of the acrylic polyol (B1) and the nonaqueous dispersion (B3) in the main composition for top clear coating, namely the ratio (A3)/[(B1)+(B3)], is 1.5/100 to 5.5/100 on the solid weight basis.

4. A decorated molding comprising a basecoat layer, a silver plating layer and a topcoat layer formed in that order on a plastic substrate, wherein the basecoat layer is one formed by using a base coating composition for decorated moldings containing silver plating layer comprising a main composition for base coating comprising an acrylic polyol (A1), at least one selected from the group consisting of a polyester-modified acrylic group-containing polydimethylsiloxane and a poly-ether modified polydimethylsiloxane (A2) and an epoxysilane (A3) represented by the chemical scheme (1):

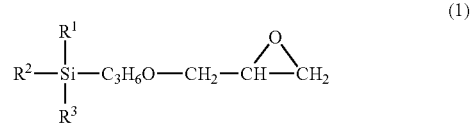

(1)

in the scheme, $R^1$ represents a methyl, methoxy or ethoxy group and $R^2$ and $R^3$ are the same or different and each represents a methoxy or ethoxy group, in the main composition for base coating, the (A2)/(A1) ratio being 0.02/100 to 0.20/100 on the solid weight basis, and a curing agent for base coating comprising a polyisocyanate, wherein the base coating composition for decorated moldings is a two-package curing urethane coating composition, and the (A3)/(A1) ratio is 1.5/100 to 5.5/100 on the solid weight basis, and the equivalent ratio between the NCO groups in the curing agent for base coating and the OH groups in the acrylic polyol (A1), namely the NCO/OH equivalent ratio, is 1.5 to 3.0, and the topcoat layer is one formed by using the top clear coating composition for decorated moldings containing silver plating layer according to claim 2 or 3.

5. The decorated molding according to claim 4 which has a primer layer between the plastic substrate and the basecoat layer.

* * * * *